United States Patent [19]
Ikeda et al.

[11] Patent Number: 5,938,955
[45] Date of Patent: Aug. 17, 1999

[54] CONSUMABLE ELECTRODE TYPE ARC WELDING METHOD AND DEVICE

[75] Inventors: Kazuhiro Ikeda, Hirakata; Takayuki Murata, Akashi; Hiroaki Kitatsuji, Kakogawa; Hideki Futayabu, Kobe, all of Japan

[73] Assignee: Kawasaki Jukogyo Kabushiki Kaisha, Hyogo, Japan

[21] Appl. No.: 08/924,114

[22] Filed: Sep. 5, 1997

[30] Foreign Application Priority Data

Sep. 9, 1996 [JP] Japan .................................. 8-261444

[51] Int. Cl.⁶ .................................................. B23K 9/022
[52] U.S. Cl. .................. 219/124.34; 219/125.12
[58] Field of Search .................. 219/124.34, 125.12, 219/130.21; 901/42

[56] References Cited

FOREIGN PATENT DOCUMENTS

| | | |
|---|---|---|
| 56-80376 | 7/1981 | Japan . |
| 56-80377 | 7/1981 | Japan . |
| 58-122179 | 7/1983 | Japan . |
| 60-54011 | 3/1985 | Japan . |

*Primary Examiner*—Clifford C. Shaw
*Attorney, Agent, or Firm*—Marshall, O'Toole, Gerstein, Murray & Borun

[57] ABSTRACT

Provided is a consumable electrode type arc welding method and device in which stable welding can be performed at a high speed for a welding gap greater than a thickness of a base metal and the like, and welding conditions are automatically changed according to the welding gap along a welding line to perform the stable welding. A first base metal extended vertically and a second base metal which has an upper end positioned in a middle portion of the first base metal and is provided along the first base metal are welded together. The first and second base metals have a thickness of 2.8 mm, and an arc is generated toward an upper end portion of the second base metal from obliquely above on a side opposite to the first base metal. The second base metal is melted to be a part of a weld metal. An amount of the second base metal to be melted is increased or decreased according to a welding gap detected by a laser sensor. The tip of a welding wire generating the arc is rotated at high rotational frequencies as a function of increases in the welding gap. Welding tip rotation provides a centrifugal force sufficient to cause drops of melted metal to be dispersed and deposited on the first base metal so that a weld metal is also formed on the first base metal.

10 Claims, 4 Drawing Sheets

５，９３８，９５５

CONSUMABLE ELECTRODE TYPE ARC WELDING METHOD AND DEVICE

FIELD OF THE INVENTION

The present invention relates to a consumable electrode type arc welding method and device for welding a base metal having a welding gap.

DESCRIPTION OF THE RELATED ART

FIG. 7 is a typical diagram for explaining welding performed by a consumable electrode type arc welding device according to the prior art. In FIG. 7, the reference numeral 1 denotes a first base metal which is extended vertically, and the reference numeral 2 denotes a second base metal which has an upper end positioned in a middle portion of the first base metal 1 and is provided along the first base metal 1. The first and second base metals 1 and 2 are formed of thin plates having a thickness t of about 2.8 mm. A welding gap G is formed between the first base metal 1 and the upper end of the second base metal 2. The welding gap G is generated at a sheet metal working step or a press step of the first and second base metals 1 and 2.

In FIG. 7, the reference numeral 33 denotes a welding wire which passes through a contact chip (not shown) in a welding torch (not shown) fed toward the first and second base metals 1 and 2 by a wire feeder (not shown). An arrow shown in FIG. 7 indicates a position targeted by the welding wire 33 and a position where an extension of an upper end face of the second base metal 2 and a surface of the first base metal 1 intersect.

In the welding, a positive electrode of a welding supply (not shown) is generally connected to the welding wire 33, and a negative electrode of the welding supply is connected to the first and second base metals 1 and 2. An arc is generated between a tip portion of the welding wire 33 and the first and second base metals 1 and 2 while feeding the welding wire 33 in a direction shown by the arrow in FIG. 7. A tip side of the welding wire 33 is melted by the generated arc, thereby forming a weld metal between the first and second base metals 1 and 2. Thus, the welding is performed so as to fill the welding metal in the welding gap G. By such a method, if the welding gap G has a size of about 2 to 3 mm or less, the welding can be performed comparatively stably.

According to the conventional arc welding device and method described above, the welding can be performed comparatively stably for the welding gap G having a size of about 2 to 3 mm or less. However, even if the first and second base metals 1 and 2 have a thickness of about 2.8 mm, a welding gap G having a size of about 6 to 7 mm is sometimes generated depending on an object to be welded. It is necessary to form a large amount of the weld metal for such a great welding gap G. For this purpose, it is supposed that a welding current should be increased or a welding speed should be reduced. In this case, however, arc heat input to the first and second base metals 1 and 2 is increased so that burn-through is generated on the first base metal 1 or the upper end of the second base metal 2 easily burns through. Consequently, it is difficult to form a stable bead between the first and second base metals 1 and 2.

In order to solve the above-mentioned problems, Japanese Laid Open(Unexamined) Patent Publication No. SHO 56-80376 or SHO 56-80377 has been disclosed. However, these have proposed that fusing of a welding wire is repeated several times by a short-circuit current and welding is then performed by a stationary arc. Therefore, although the burn-through of the second base metal 2 can be prevented, the welding speed is reduced.

SUMMARY OF THE INVENTION

In order to eliminate the above-mentioned drawbacks according to the prior art, it is an object of the present invention to provide a consumable electrode type arc welding method and device capable of performing stable welding at a high speed for a welding gap and the like having a greater size than a thickness of a base metal.

The present invention provides a consumable electrode type arc welding method for welding a first base metal extended vertically, and a second base metal formed of a thin plate which has an upper end positioned in a middle portion of the first base metal and is provided along the first base metal, comprising the steps of generating an arc in a direction of an upper end portion of the second base metal from obliquely above on a side opposite to a first base metal, and melting the second base metal and making the melted second base metal as a part of a weld metal; detecting a welding gap between the first base metal and the upper end portion of the second base metal; and rotating a tip of a welding wire generating the arc when the welding gap has a predetermined value or more.

The present invention also provides a consumable electrode type arc welding device for welding a first base metal extended vertically, and a second base metal formed of a thin plate which has an upper end positioned in a middle portion of the first base metal and is provided along the first base metal, comprising arc generating means for generating an arc in a direction of an upper end portion of the second base metal from obliquely above on a side opposite to the first base metal, and melting the second base metal by a predetermined height from the upper end thereof and making the melted second base metal as a part of a weld metal; detecting means for detecting a welding gap between the first base metal and the upper end portion of the second base metal; and rotating means for rotating the tip of the welding wire; and control means, wherein said control means controls said rotating means so as to rotate the tip of the welding wire when said welding gap has a predetermined value or more.

In the consumable electrode type arc welding method or device according to the present invention, an arc is generated in a direction of an upper end portion of the second base metal from obliquely above on a side opposite to the first base metal, and the tip of the welding wire is rotated for the welding gap having a predetermined value or more. Consequently, melted metal is scattered by a centrifugal force generated by said rotating and deposited on the first base metal so that the weld metal is formed on the first base metal as well as on the second base metal. Therefore, a bridge of weld metal is easily formed between both base metals, and it is possible to perform speedy and stable welding for the welding gap which is greater than a thickness of the second base metal.

A first additional feature of the consumable electrode type arc welding method according to the present invention is that a rotating frequency of the tip of the welding wire is increased when the welding gap becomes greater.

A first additional feature of the consumable electrode type arc welding device according to the present invention is that the control means controls the rotating means so as to increase the frequency of said rotating when the welding gap becomes greater.

In the consumable electrode type arc welding method or device having the first additional feature according to the present invention, heat input is dispersed more by increasing the rotating frequency as the welding gap becomes greater. Consequently, stable welding can surely be performed depending on the value of the welding gap.

A second additional feature of the consumable electrode type arc welding method according to the present invention is that a rotating frequency of the tip of the welding wire is set to be in the range from about 30 Hz to about 120 Hz.

A second additional feature of the consumable electrode type arc welding device according to the present invention is that the rotating means rotates the tip of the welding wire in the frequency is set to be in the range from about 30 Hz to about 120 Hz.

In the consumable electrode type arc welding method or device having the second additional feature according to the present invention, speedy and stable welding can surely be performed by rotating the tip of the welding wire in high speed.

A third additional feature of the consumable electrode type arc welding method according to the present invention is that a diameter of said rotating the tip of the welding wire is set to be in the range from about 2 mm to about 4 mm.

A third additional feature of the consumable electrode type arc welding device according to the present invention is that the rotating means rotates the tip of the welding wire in the diameters range from about 2 mm to about 4 mm.

Said diameter of the rotating means a diameter of a locus of the tip of the rotational welding wire.

In the consumable electrode type arc welding method or device having the third additional feature according to the present invention, dispersion of the heat input becomes suitable for speedy and stable.

DETAILED DESCRIPTION OF THE INVENTION

A preferred embodiment of a consumable electrode type arc welding device according to the present invention will be described below in detail together with a preferred embodiment of a consumable electrode type arc welding method with reference to the drawings.

Figure 3:
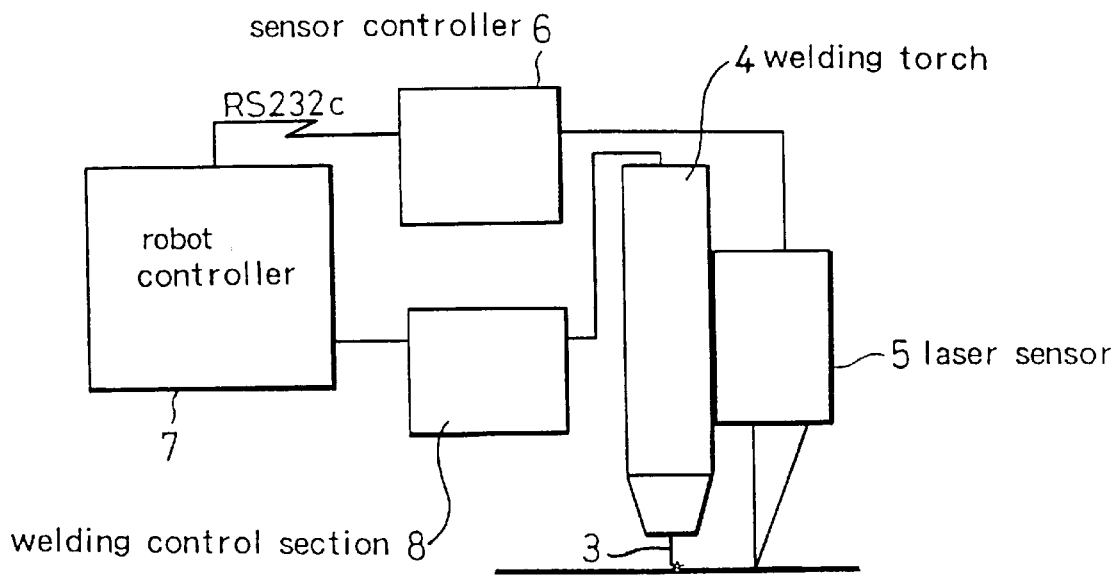
FIG. 3 is a schematic diagram showing a system of an example of the arc welding device.

FIG. 3 is a schematic diagram showing a system of the arc welding device. In FIG. 3, the reference numeral 5 denotes a laser sensor (detecting means) for detecting a size of a welding gap G, a position of a welding line and the like. An output signal of the laser sensor 5 is amplified and processed by a sensor controller 6, and is sent to a robot controller (control means) 7 through a RS232C communication line. The reference numeral 4 denotes a welding torch, and the reference numeral 8 denotes a welding control section including an arc control section 8b (See FIG. 4) having a welding supply and a welding wire feeder, a robot arm 8a (See FIG. 4) for moving the welding torch 4 and the like. The welding control section 8 and the welding torch 4 form arc generating means. Power given from the welding supply causes an arc to be generated between the base metal and a welding wire 3 sent from the welding torch 4 toward the base metal on the welding line.

Figure 2:
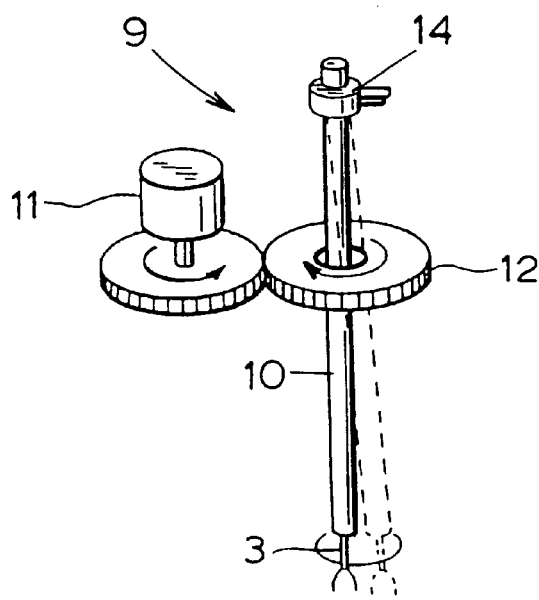
FIG. 2 is a perspective illustration showing a rotating means of an arc welding device according to the present invention.

FIG. 2 is a perspective illustration showing a rotating means 9 located in the above mentioned welding torch 4. Said rotating means 9 has a driving motor 11 on which a driving gear 13 is mounted and an eccentric gear 12 which engages said driving gear 13, wherein a power supply cable 10 supported by a supporting member 14 is biasely penetrated into an selfaligning bearing (not shown) disposed on the center of said eccentric gear 12. Further, said rotating means works by means of driving a rotating motor 11 via a driving circuit (system) mounted on said arc control section 8b so as to rotate the tip of a welding wire 3 around a supporting member 14.

Figure 4:
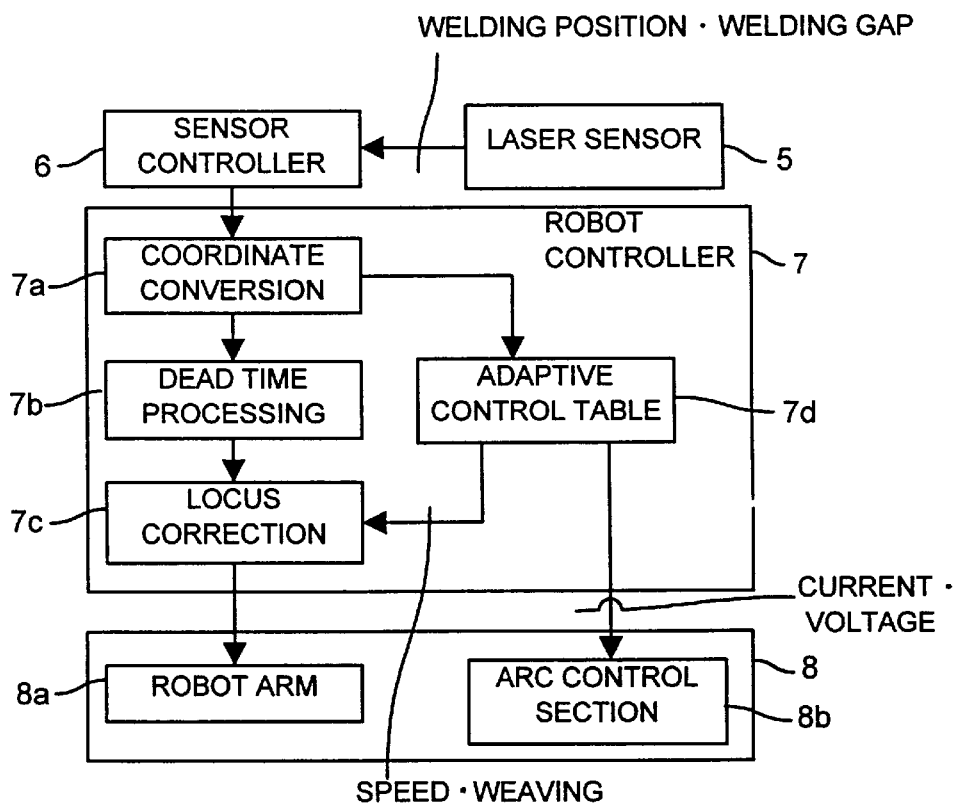
FIG. 4 is a block diagram for explaining control operation of the arc welding device.

FIG. 4 is a block diagram for explaining control operation of the arc welding device. Laser beams are emitted from the laser sensor 5 toward the base metal, and an output signal based on reflected light is sent to the sensor controller 6. The sensor controller 6 amplifies and processes the signal as described above, and sends, to the robot controller 7, a welding position calculated by a sensor coordinate system, a gap width and the like. The robot controller 7 is formed by using an integrated circuit including the function of a microcomputer, and serves to perform a coordinate conversion 7a for the received signal and to grasp a position targeted by the welding wire 3 and the size of the welding gap G by a robot coordinate system. By using this result, a necessary control value is read from an adaptive control table 7d to control a current, a voltage and the like of the arc control section 8b and to perform a locus correction 7c of the robot arm 8a. The reference numeral 7b denotes a dead time processing of performing the proper locus correction 7c and the like in consideration of a time required for transmission from the sensor controller 6 to the robot controller 7.

Figure 5:
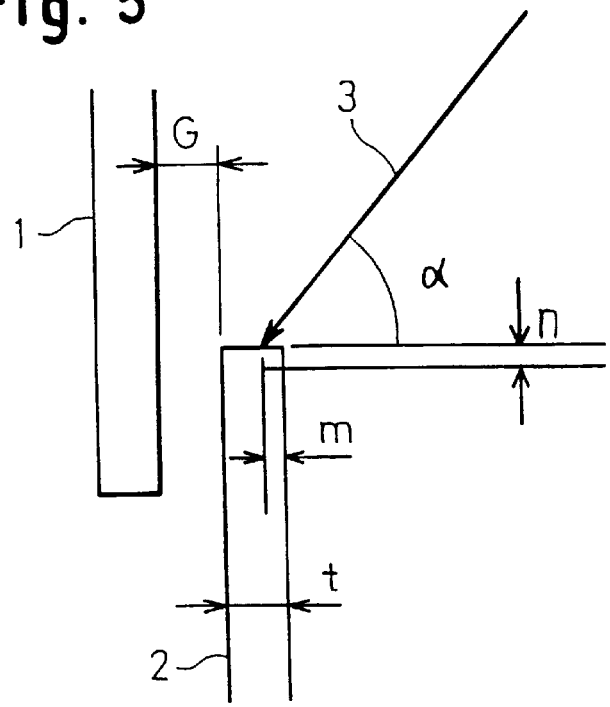
FIG. 5 is a typical diagram for explaining welding performed by an arc welding method and device according to an embodiment of the present invention.

Operation of the arc welding device will be described below. FIG. 5 is a diagram for explaining the welding base metal and the position targeted by the welding wire 3. The welding base metal includes a first base metal 1 extended vertically, and a second base metal 2 which has an upper end positioned in a middle portion of the first base metal 1 and is provided along the first base metal 1. A welding gap G having a size of about 0 to 7 mm is formed between the first and second base metals 1 and 2. The first and second base metals 1 and 2 are formed of thin plates having a thickness t of about 2.8 mm, and are made of rolled steel sheets. When a position of the upper end of the second base metal 2 is detected by the laser sensor 5, the robot controller 7 controls the robot arm 8a. The position targeted by the welding wire 3 is set in a region R formed around a corner on a side opposite to the first base metal 1 on the upper end of the second base metal 2. The region R is formed between a position on the upper end face with a distance m of about 1 mm apart from the corner and a position on a side face opposite to the first base metal 1 with a downward distance n of about 1 mm. The welding wire 3 is fed from obliquely above on the side opposite to the first base metal 1 with a torch angle (α) of about 25 degree to 50 degree horizontal to the target position. The target position and the torch angle are set into such a range that effects of the present invention can surely be obtained. Even if they depart from this range, all the effects of the present invention are not eliminated.

Figure 6:
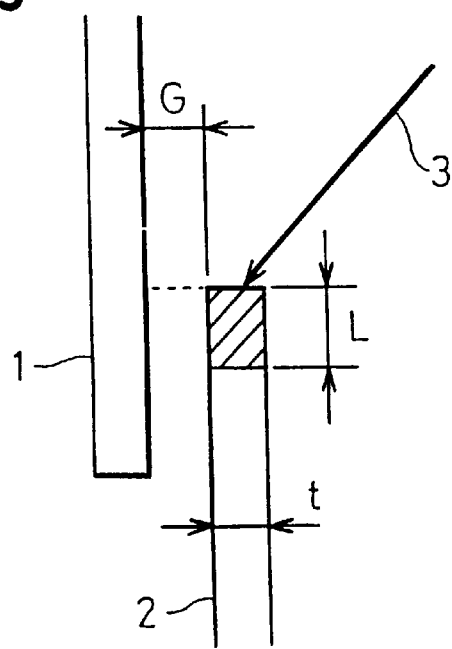
FIG. 6 is a diagram for explaining above mentioned welding method.
Figure 7:
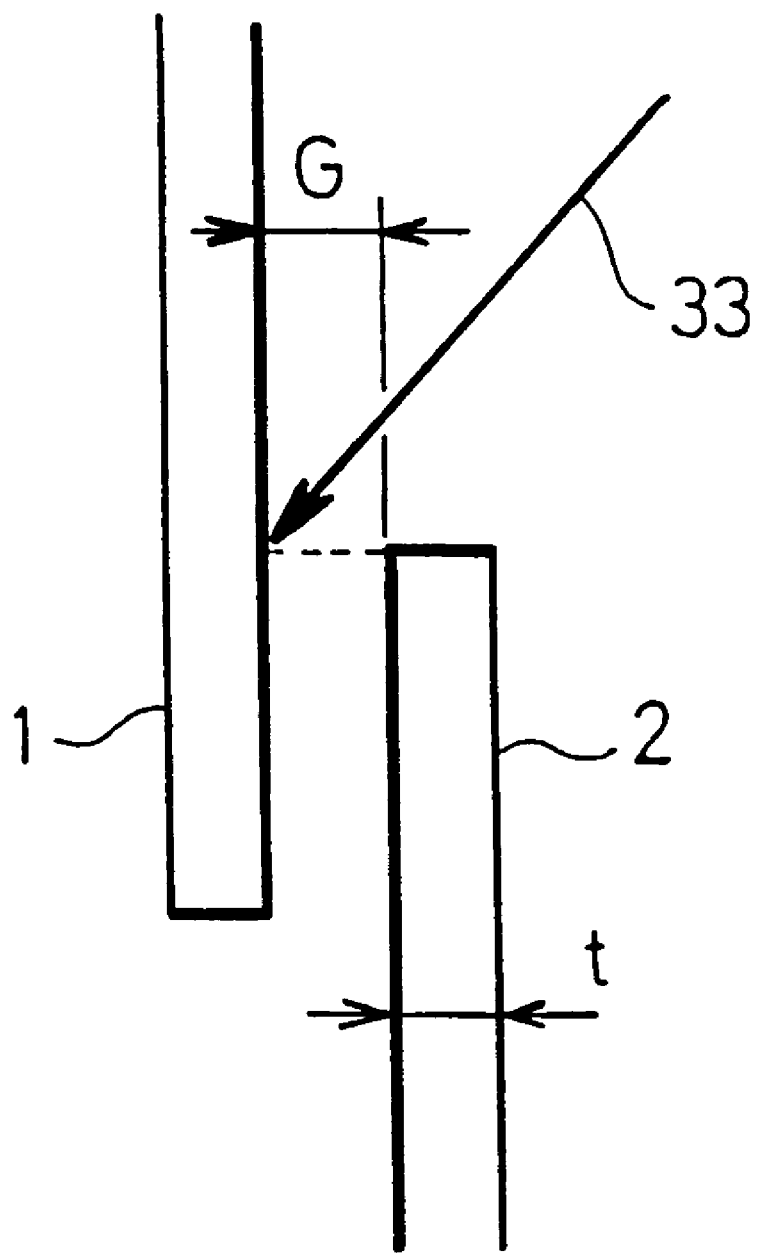
FIG. 7 is a typical diagram for explaining welding method according to the prior art.

FIG. 6 is a diagram for explaining welding performed by the above-mentioned arc welding device. As described with reference to FIG. 5, when the welding wire 3 is fed, the arc is generated from obliquely above on the side opposite to the first base metal 1 with respect to the upper end of the second base metal 2. Consequently, the second base metal 2 is melted by the arc and flows to the first base metal 1 side for a predetermined height L from the upper end thereof by an arc pressure so as to become a weld metal cross linking the welding gap G from the second base metal side combined with the melted metal of the welding wire. It is preferable to use the welding wire of 1.2 mm in diameter and to use Argon gas including 15~20% $CO_2$ gas for shield gas.

In case the welding gap G is 3.5 mm or more, the welding device performs welding by driving said rotational means 9. In particularly, the driving motor 11 of a rotational means 9 is driven by the welding control section 8 operating according to the command transmitted from the robot controller 7 so as to rotate the tip of a welding wire 3. The rotation is performed at a higher speed with an increase in the welding gap G so that a rotational frequency becomes about 60 Hz when the welding gap G is about 3.5 mm, and becomes about 100 Hz when the welding gap G is 7 mm. The diameter of the rotation under such frequency, which is a diameter of a locus of the rotating tip of welding wire 3 is set to be about 2 mm.

Figure 1:
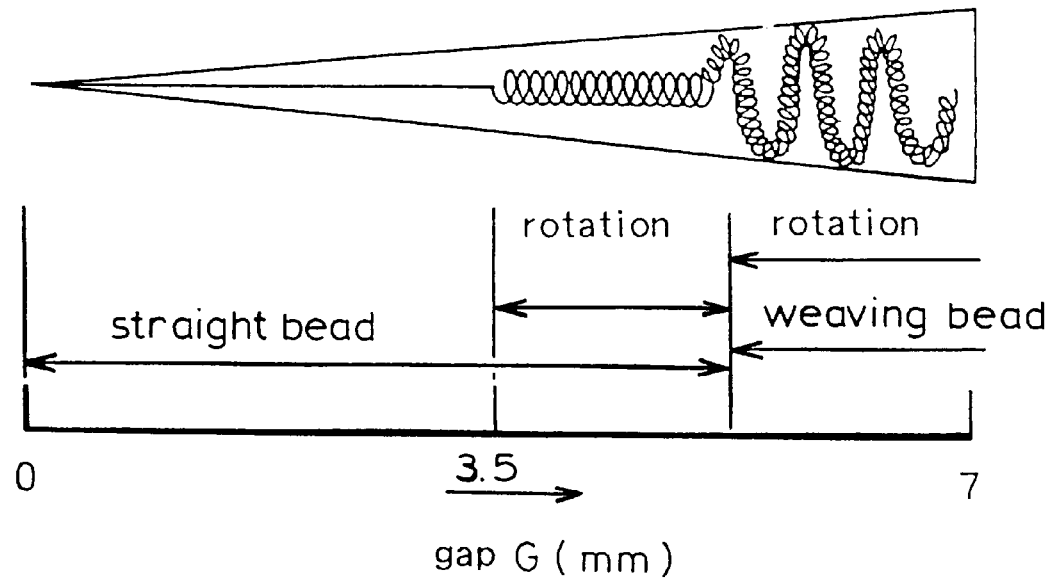
FIG. 1 is a diagram showing a locus of a tip of a welding wire in an arc welding method and device according to an embodiment of the present invention.

In case the welding gap G is 5.2 mm or more, weaving of the welding wire 3 is additionally performed. By driving a torch moving mechanism of the robot arm 8a and the like, the generated arc is caused to oscillate so as to have an oscillating component in a direction orthogonal to the welding line. An amplitude is made greater when the welding gap G is increased. For example, the amplitude is about 1.0 mm when the welding gap G is 5.2 mm, and is about 1.5 mm when the welding gap G is 6 to 7 mm. FIG. 1 typically shows a locus of the above-mentioned rotational tip of the welding wire and an arc obtained by performing the weaving. As a result of the weaving, the movement of the arc includes a component orthogonal to the welding line. Therefore, the welding speed is reduced according to the amplitude.

In the arc welding device having the above-mentioned structure and the arc welding method using the arc welding device, the arc is generated in targeting the upper end of the second base metal 2 so that the second base metal 2 is melted to be a part of a weld metal. Accordingly, an amount of the weld metal generated at the second base side 2 is increased more than in the prior art. On the other hand, when the welding gap G is 3.5 mm or more, the welding device performs welding by rotating tip of welding wire 3. Such rotation, the diameter of which is set to be about 2 mm, does not prevent an arc pressure and an arc heat from being mainly given for the upper end of the second base metal 2. Thus, the weld metal is formed from the second base metal 2 in high voltage and high speed. Further, the frequency of the above rotation is kept to be high level in the range of about 30 Hz~120 Hz. Therefore, according to centrifugal force caused by the rotation, drops of melted metal are dispersed and deposited on the first base metal 1 so that a weld metal is formed on the first base metal 1 as well as the second base metal 2. Consequently, a stable bridge (linkage) between the first base metal 1 and the second base metal 2 are achieved for a greater welding gap G. In addition, as such welding arc is not directed to the first base metal, welding can surely be performed without causing burn-through of the first base metal 1 even the welding is performed under higher welding current.

The above mentioned frequency of the rotation is set to become larger as a gap G become greater. As the frequency becomes larger, the centrifugal force which works to the amount of drops of melted metal generated at the tip of welding wire 3 increases, which results in accelerating of melting speed of welding wire 3, as well as increasing of drops of the melted metal dispersed on the first base metal 1. Therefore, a stable generation of bead can be achieved corresponding to the width of the welding gap G varying along to a weld line. In case the welding gap is 5.2 mm or more, the weaving is performed so that stable welding can be performed even if a bead is increased. In addition, the amplitude of the weaving is increased or decreased depending on the width of the welding gap G which is detected. Consequently, a stable welding can be selected according to the dimension of welding gap G detected by the laser sensor 5. By using the weaving and the rotational arc together, high-speed critical humping is hardly caused due to an apparent reduction in the arc force and the like. Consequently, the welding speed can be increased.

As shown in FIG. 2, the rotating means 9 which rotates the tip of the welding wire 3 has quite simple construction, which means that such rotating means 9 can be equipped without any expensive cost.

While the preferred embodiment of the present invention has been described above, the present invention is not restricted thereto but can variously be modified and embodied within the range of the invention. While the weaving and the rotational welding wire have been used together with the great welding gap G, only the rotating of the welding wire may be performed with the welding gap G of 3.5 mm or more. The dimension of welding gap G where the rotation is started may be varied, namely, it is also possible to select the dimension of the welding gap G where the rotation is started according to the welding circumstances and the like. Especially, in case of relatively smaller welding gap G as like about 2 mm gap, by using the rotating said welding ware 3, high-speed critical humping is hardly caused due to an apparent reduction in the arc force and the like. Consequently, the welding speed can be increased. Further, each frequency and diameter of the rotation can be varied within the scope of the present invention. In addition, the construction of the rotating means 9 is not to be restricted to that of shown in FIG. 2. For example, it may also possible to apply a construction such that a welding wire 3 is eccentrically penetrated through the electric supplying cable 10 so as to rotate the electric supplying cable 10 by the driving motor 11.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A consumable electrode type arc welding method for welding a first base metal extended vertically, and a second base metal formed of a thin plate which has an upper end positioned in a middle portion of the first base metal and is provided along the first base metal, comprising the steps of;

generating an arc in a direction of an upper end portion of the second base metal from obliquely above on a side opposite to a first base metal, and melting the second base metal and making the melted second base metal as a part of a weld metal;

detecting a welding gap between the first base metal and the upper end portion of the second base metal; and selectively rotating a tip of a welding wire generating the arc such that the tip is rotated when the welding gap is greater than a predetermined value, but the tip is not rotated when the welding gap is less than the predetermined value.

2. The consumable electrode type arc welding method as defined in claim 1, wherein a rotating frequency of the tip of the welding wire is set to be in the range from about 30 Hz to about 120 Hz.

3. The consumable electrode type arc welding method as defined in claim 1, wherein a diameter of said rotating of the tip of the welding wire is set to be in the range from about 2 mm to about 4 mm.

4. The consumable electrode type arc welding method as defined in claim 1, wherein a rotating frequency of the tip of the welding wire provides a centrifugal force sufficient to cause drops of melted metal to be dispersed and deposited on said first base metal so that a weld metal is formed on said first base metal and said second base metal.

5. A consumable electrode type arc welding method for welding a first base metal extended vertically, and a second base metal formed of a thin plate which has an upper end positioned in a middle portion of the first base metal and is provided along the first base metal, comprising the steps of;

generating an arc in a direction of an upper end portion of the second base metal from obliquely above on a side opposite to a first base metal, and melting the second base metal and making the melted second base metal as a part of a weld metal;

detecting a welding gap between the first base metal and the upper end portion of the second base metal;

rotating a tip of a welding wire generating the arc when the welding gap has a predetermined value or more; and increasing a rotating frequency of the tip of the welding wire when the welding gap becomes greater.

6. A consumable electrode type arc welding device for welding a first base metal extended vertically, and a second base metal formed of a thin plate which has an upper end positioned in a middle portion of the first base metal and is provided along the first base metal, comprising;

arc generating means for generating an arc in a direction of an upper end portion of the second base metal from obliquely above on a side opposite to the first base metal, and melting the second base metal by a predetermined height from the upper end thereof and making the melted second base metal as a part of a weld metal;

detecting means for detecting a welding gap between the first base metal and the upper end portion of the second base metal;

rotating means for rotating the tip of the welding wire; and control means, wherein, said control means controls said rotating means so as to selectively rotate the tip of the welding wire when said welding gap is greater than a predetermined value, but the tip is not rotated when the welding gap is less than the predetermined value.

7. The consumable electrode type arc welding device as defined in claim 6, wherein the rotating means rotates the tip of the welding wire in the frequencies range from about 30 Hz to about 120 Hz.

8. The consumable electrode type arc welding device as defined in claim 6, wherein the rotating means rotates the tip of the welding wire in the diameters range from about 2 mm to about 4 mm.

9. The consumable electrode type arc welding device as defined in claim 6, wherein a rotating frequency of the tip of the welding wire provides a centrifugal force sufficient to cause drops of melted metal to be dispersed and deposited on said first base metal so that a weld metal is formed on said first base metal an said second base metal.

10. A consumable electrode type arc welding device for welding a first base metal extended vertically, and a second base metal formed of a thin plate which has an upper end positioned in a middle portion of the first base metal and is provided along the first base metal, comprising;

arc generating means for generating an arc in a direction of an upper end portion of the second base metal from obliquely above on a side opposite to the first base metal, and melting the second base metal by a predetermined height from the upper end thereof and making the melted second base metal as a part of a weld metal;

detecting means for detecting a welding gap between the first base metal and the upper end portion of the second base metal;

rotating means for rotating the tip of the welding wire;

control means, wherein, said control means controls said rotating means so as to rotate the tip of the welding wire when said welding gap has a predetermined value or more; and said control means controls the rotating means so as to increase the frequency of said rotating when the welding gap becomes greater.

* * * * *